(12) United States Patent
Hanzawa (10) Patent No.: US 7,280,274 B2
(45) Date of Patent: Oct. 9, 2007

(54) THREE-DIMENSIONAL IMAGE OBSERVATION MICROSCOPE SYSTEM

(75) Inventor: Toyoharu Hanzawa, Mitaka (JP)

(73) Assignee: Olympus Medical Systems Corp., Tokyo (JP)

(*) Notice: Subject to any disclaimer, the term of this patent is extended or adjusted under 35 U.S.C. 154(b) by 32 days.

(21) Appl. No.: 11/337,652

(22) Filed: Jan. 24, 2006

(65) Prior Publication Data

US 2006/0181767 A1    Aug. 17, 2006

(30) Foreign Application Priority Data

Jan. 24, 2005 (JP) ............... 2005-016189

(51) Int. Cl.
   *G02B 23/24* (2006.01)
   *G02B 21/00* (2006.01)
(52) U.S. Cl. ............... 359/363; 359/368; 359/466
(58) Field of Classification Search ............... 359/362, 359/368–390, 422–432, 462–477, 676–678
   See application file for complete search history.

(56) References Cited

U.S. PATENT DOCUMENTS 5,552,929 A * 9/1996 Fukaya et al. ............... 359/380
5,689,365 A * 11/1997 Takahashi ............... 359/362
6,525,878 B1 * 2/2003 Takahashi ............... 359/466
7,160,249 B2 * 1/2007 Hasegawa ............... 600/167
2003/0067422 A1   4/2003 Suyama et al. ............... 345/6

FOREIGN PATENT DOCUMENTS

JP   2000-214413   8/2000
JP   2002-341473   11/2002

* cited by examiner

*Primary Examiner*—Thong Q Nguyen
(74) *Attorney, Agent, or Firm*—Arnold International; Jon W. Henry; Bruce Y. Arnold (57) ABSTRACT

A three-dimensional image observation microscope system includes an imaging unit that captures images focused at different object point distances in an optical axis direction and a display unit that displays a plurality of the images captured by the imaging unit for overlaid observation along the line of sight of a viewer as a three-dimensional image. The imaging unit includes an objective optical system that obtains an image of an object, a zoom optical system that controls the magnification of the image obtained by the objective optical system, and a plurality of image pickup devices that capture the images with a magnification controlled by the zoom optical system. Specified conditions related to focal length, numerical apertures, inclinations, magnifications and distances within the imaging unit and the display unit are satisfied.

6 Claims, 10 Drawing Sheets

THREE-DIMENSIONAL IMAGE OBSERVATION MICROSCOPE SYSTEM

CROSS-REFERENCE TO RELATED APPLICATION

This application claims the benefit of foreign priority of JP 2005-16189, filed Jan. 24, 2005, the contents of which are hereby incorporated by reference.

TECHNICAL FIELD OF THE INVENTION

The present invention relates to a three-dimensional image observation microscope system suitable for observing objects to be worked on. Specifically, the present invention relates to a microscope system that includes an imaging unit and a display unit for three-dimensional observation using electronic images.

BACKGROUND OF THE INVENTION

Stereomicroscopes are conventionally used in fine processing under a microscope, or surgical operations under a microscope where, for example, accurate work on a small area around a lesion is required. Recently, there has been demand for conducting these tasks using remote control. If the capabilities of a remote operation are available, a processing engineer or a doctor can conduct the task from a remote location without traveling to the actual processing or operating site. It is desirable for realizing such a remote operation that images of an object observed by a stereomicroscope be formed and displayed on a display unit.

An apparatus that allows the viewer to three-dimensionally observe displayed images with the help of binocular parallax is known. For example, in some stereoscopic image observation apparatuses, images of an object are captured from different angles so that the effects of binocular parallax appear in images displayed on a display unit, and the viewer observes separate left and right images having parallax with his left and right eyes, respectively, for three-dimensional observation.

In such an apparatus, the resolution on the image pickup surface deteriorates as the optical system of the imaging part has a larger depth of field. On the other hand, as the optical system of the imaging part has a larger aperture for higher resolution on the image pickup surface, the depth of field inherently becomes smaller, and this can create problems. In applying a stereoscopic image observation apparatus to surgical operations and fine processing under a microscope, deterioration in resolution of observed images is not acceptable because it directly affects the accuracy of the operation performed by the operator. When such a stereoscopic image observation apparatus is used in a surgical operation under a microscope, the optical system of the imaging part inherently provides a smaller depth of field in order to obtain higher resolution observation images. Consequently, the operator is required to frequently refocus during the operation, causing lowered performance and operator fatigue.

It is known that stereoscopic images provided by the prior art stereoscopic image observation apparatuses are difficult to see three-dimensionally in the line of sight of the viewer. In other words, the larger features of an object image, for example, the general contour of an object, are relatively easy to see three-dimensionally. However, an object near the direction of the line of sight of the viewer is observed as lying in a plane with no three-dimensional appearance. Therefore, the viewer cannot recognize the object as being three-dimensional. Images lacking a three-dimensional appearance in the line of sight of the viewer may cause the operator to misunderstand the shape of the object and, therefore, are not suitable for the applications described above.

In order to solve the above problem, techniques using lenticular optical elements and holograms that can provide three-dimensional information in the line of sight of the viewer have been proposed in the prior art. However, these techniques do not provide an imaging system with sufficient resolution and it is difficult to put such techniques into practical use. Techniques using DFD (depth-fused 3D) devices have been proposed in Japanese Laid-Open Patent Application Nos. 2000-214413 and 2000-341473.

Japanese Laid-Open Patent Application No. 2000-214413 discloses that positional relationships among multiple images may be expressed by changing display densities of the same point of multiple images arranged in the line of sight. Japanese Laid-Open Patent Application No. 2000-341473 discloses a case in which a focused image and an unfocused image that are spaced from each other in the optical axis direction are separately captured and then displayed in an overlaid manner in order to increase the amount of information in the line of sight of an observer so that the observer recognizes a three-dimensional image.

It is generally considered in the prior art that an observer simply recognizes multiple images and never identifies a three-dimensional image when images are overlaid. Further, an unfocused image is considered to cause deterioration of an image, such as by reducing the contrast. Therefore, image correction such as deletion of unfocused areas is made.

However, in fact, when an unfocused image is overlaid in the line of sight of a viewer without changing the unfocused image, the unfocused image contributes to giving a three-dimensional appearance in the line of sight of the viewer, and thus the viewer can observe a natural three-dimensional image. The techniques described in Japanese Laid-Open Patent Application Nos. 2000-214413 and 2000-341473, described above, utilize the fact that the viewer recognizes multiple images in the line of sight as point information and considers changes in image contrast (i.e., changes in density of an image) to be three-dimensional information. However, three-dimensional images created by those techniques do not have a sufficient three-dimensional appearance for using them in surgical operations under a microscope.

BRIEF SUMMARY OF THE INVENTION

The present invention relates to a three-dimensional image observation microscope system wherein an observed object is displayed as a three-dimensional image that includes sufficient three-dimensional information for surgical operations under a microscope, that favorably reproduces the three-dimensional appearance of the observed object, and that does not cause fatigue of the viewer after a prolonged observation.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The three-dimensional image observation microscope system of the present invention includes an imaging unit that captures images focused at different object point distances in an optical axis direction and a display unit that displays a plurality of images that are captured by the imaging unit for overlaid observation along the line of sight of a viewer.

The imaging unit includes an objective optical system that obtains an image of an object, a zoom optical system that controls the magnification of the image obtained by the objective optical system, and a plurality of image pickup devices that capture these images with a magnification that is controlled by the zoom optical system. The optical system of the imaging unit includes the objective optical system, the zoom optical system, and any other optics that the imaging unit uses to form an image.

Additionally, it is desirable that the zoom optical system be placed in an afocal light beam. Also, it is desirable that the following Conditions (1), (2), and (3) be satisfied:

$$fob \cdot NAmax \geq 15 \text{ mm} \quad \text{Condition (1)}$$

$$NAmin \geq 0.02 \quad \text{Condition (2)}$$

$$0.25 \leq d \cdot NA/(R \cdot \beta) \leq 2 \quad \text{Condition (3)}$$

where fob is the focal length, in mm, of the objective optical system;

NAmax is the maximum object-side numerical aperture of the objective optical system of the imaging unit;

NAmin is the minimum object-side numerical aperture of the objective optical system of the imaging unit;

d is the distance, in mm, between two adjacent image pickup surfaces of the image pickup devices;

NA is the object-side numerical aperture of the objective optical system of the imaging unit when the zoom optical system has a magnification $\beta$;

R is the width, in mm, of a pair of black and white lines when the pair of black and white lines are part of a test chart having evenly-spaced, parallel sets of black and white lines and the test chart is placed in a plane that is conjugate with an image pickup surface of one of the image pickup devices with respect to the objective optical system of the imaging unit so that an image of the pair of black and white lines is captured on the image pickup surface of one of the image pickup devices in such a maimer that the black and white lines are displayed on a monitor with a contrast of 10% through a circuit system that processes image signals sent from the image pickup devices;

$\beta$ is the magnification of the zoom optical system.

Condition (1) ensures that proper work can be done using the three-dimensional image observation microscope system. If Condition (1) is not satisfied, a sufficient distance is not preserved for an object being imaged and the imaging device. Therefore, an engineer attempting fine processing or an operator in a surgical operation using the microscope, for example, to observe a small region around a lesion in order to work on it, may find it difficult to perform the desired operations properly.

Condition (2) defines the minimum object-side numerical aperture of the optical system of the imaging unit of the three-dimensional image observation microscope system. When Condition (2) is not satisfied, the image obtained has an insufficient three-dimensional appearance. Therefore, for example, when an operator works on a lesion while observing the image, it is difficult for him to identify the positional relationship between the operation tool such as a surgical knife and the lesion.

Condition (3) defines the positional relationship between adjacent image pickup surfaces of image pickup devices on the optical axis of the optical system of the imaging unit. When the lower limit of Condition (3) is not satisfied, two images obtained by the image pickup devices are not sufficiently different in contrast. Consequently, when two images that are focused on different points and displayed by the display unit as overlaid images in the line of sight, the viewer does not perceive a three-dimensional appearance based on the difference in contrast between two images and does not recognize the displayed images as a three-dimensional image. When the upper limit of Condition (3) is not satisfied, the difference in contrast between two images obtained by the image pickup devices becomes excessively large and two images displayed on the display unit do not have a close enough relationship. Consequently, the viewer does not recognize the displayed images as a three-dimensional image.

The display unit of the three-dimensional image observation microscope system overlays images that are focused at different object distances and captured by the imaging unit in the line of sight of the viewer as follows. An image focused on an object point that is closer to the imaging unit is displayed at a position that is closer to the viewer, and an image focused on an object point that is farther away from the imaging unit is displayed at a position that is farther away from the viewer.

It is desirable that a display surface 1 and a display surface 2 that are in the line of sight of the observer but at different distances from the observer satisfy the following conditions:

$$\alpha n > a \cdot E/(D+a) \quad \text{Condition (4)}$$

$$\alpha f > a \cdot E/D \quad \text{Condition (5)}$$

where

αn is the size that an object point image that is displayed on a display surface 2 that is farther away from the viewer has when it is displayed on a display surface 1 that is closer to the viewer;

a is the distance, between the display surface 1 and the display surface 2;

E is the interpupillary distance of the viewer;

D is the distance between the viewer's observation position and the display surface 1 that is closer to the viewer; and αf is the size that an object point image that is displayed on the display surface 1 that is closer to the viewer has when it is displayed on the display surface 2 that is farther away from the viewer.

A display unit must satisfy Conditions (4) and (5) above in order for the viewer to recognize images overlaid in his line of sight as a three-dimensional image. Images of one and the same object point that are displayed on the display surfaces 1 and 2 should be seen as overlapped when the viewer views them with both eyes. To this end, it is desirable that both Conditions (4) and (5) above be satisfied. When the display unit fails to satisfy at least one of Conditions (4) and (5), it is difficult for the viewer to observe the displayed image in three-dimensions, which causes undesirable eye fatigue.

The viewer generally has an interpupillary distance of approximately 55 to 75 mm. Therefore, E in Conditions (4) and (5) is first set for 80 mm or larger, and then the other parameters are determined. In this manner, a display unit providing three-dimensional observation for most viewers can be made available. By using E of a higher value, a motion parallax effect is added to the displayed image. In this way, the viewer can observe a natural three-dimensional image without failing to perceive a three-dimensional appearance even if he moves his line of sight within the display surface of the display unit.

In order to satisfy Conditions (4) and (5), it is desirable that the display unit has a digital zoom function in order to control the display magnification of each display surface.

Additionally, in order for the viewer not to fail to perceive a three-dimensional appearance of the displayed image when he changes his observation position in relation to the display unit, it is desirable that the imaging unit and the display unit satisfy the following Conditions (6) and (7):

$$NAmax \geq 0.15 \quad \text{Condition (6)}$$

$$|\beta id \cdot (Ii \cdot \tan\gamma)/D| \leq 10.2 \quad \text{Condition (7)}$$

where

NAmax is the maximum object-side numerical aperture of the objective optical system of the imaging unit;

βid is the magnification at which an image that is formed on the image pickup surface of the imaging unit is displayed on the display surface closest to the viewer;

Ii is the distance, in mm, between the optical axis and a point at the maximum image height on the image pickup surface of an image pickup device provided in the imaging unit;

γ is the inclination relative to the optical axis of the principal ray entering the image pickup surface of the image pickup device provided in the imaging unit at the point of maximum image height; and D is the distance, in mm, between the viewer's observation position and the display surface that is closest to the viewer.

Although the quantity D of Condition (7) above is defined more broadly (in relation to their possibly being more than two display surfaces) than the quantity D of Conditions (4) and (5) above is defined, both definitions define the same feature when only two display surfaces are being considered.

When the maximum object side numerical aperture of the optical system of the imaging unit does not satisfy the lower limit of Condition (6) above, the image does not exhibit a sufficient three-dimensional appearance when a microscopic object is observed at a higher magnification. Therefore, unfavorably, the viewer fails to perceive a three-dimensional appearance of the displayed image when he changes his observation position.

Condition (7) above optimizes the range in which the display unit can display three-dimensional images over the range of the image field of the imaging unit. When Condition (7) above is not satisfied, the range in which the display unit can display three-dimensional images over the image field of the imaging unit is reduced. Therefore, unfavorably, the viewer has a more limited range in which he can always recognize three-dimensional images even if he changes his observation position.

Actual microscope observations often involve three-dimensional object surfaces that are tilted in relation to the optical axis of the optical system of the imaging unit. In such cases, an unfocused image on the image pickup surface can be corrected by tilting the image pickup surface the same amount as the object surface about the optical axis of the image pickup surface of the image pickup device. Thus, it is desirable that the optical system of the imaging unit be telecentric on the image side.

Similarly in the display unit, the display surface is tilted the same amount as the image pickup surface about the center of the display surface and the image display magnification is controlled for each display surface according to the inclination of the image pickup surface. In this manner, a natural three-dimensional image with no distortion from the center to the periphery can be reproduced. To accomplish this, it is desirable that the display unit includes a mechanism that detects the inclination of the image pickup surface in relation to the optical axis and that determines the display magnification at each display surface, as well as a mechanism to process the images based on the determined display magnification.

Using the structure described above, a three-dimensional image observation microscope system is provided wherein an observed object is displayed as a three-dimensional image that includes sufficient three-dimensional information for surgical operations under the microscope, that favorably reproduces the three-dimensional appearance of an observed object in the line of sight of the viewer, and that does not cause eye fatigue of the viewer even after prolonged periods of observation.

Embodiments 1-5 of the present invention will now be individually described with reference to the drawings.

EMBODIMENT 1

Figure 1:
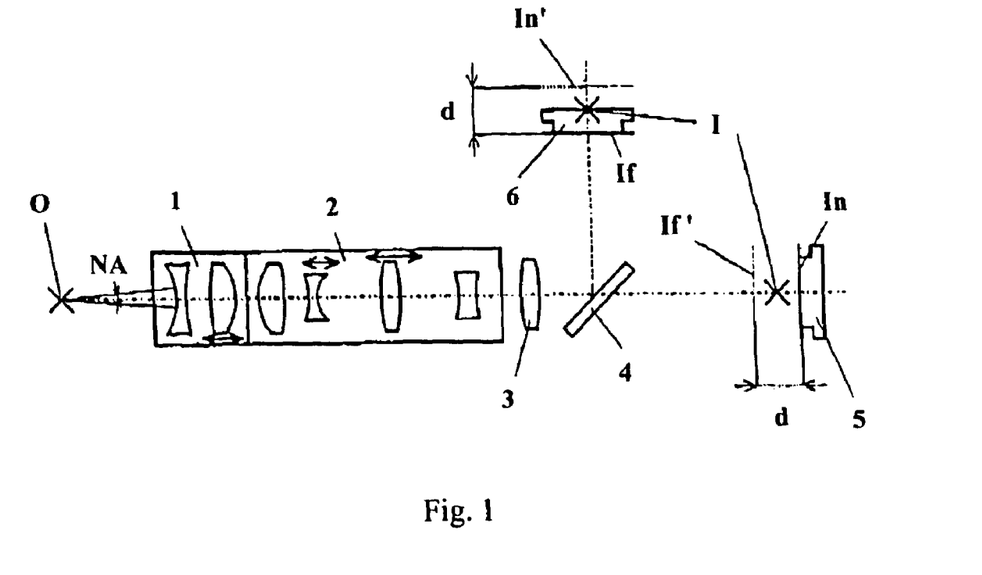
FIG. 1 shows an imaging unit of a three-dimensional image observation microscope system of Embodiment 1.
Figure 2:
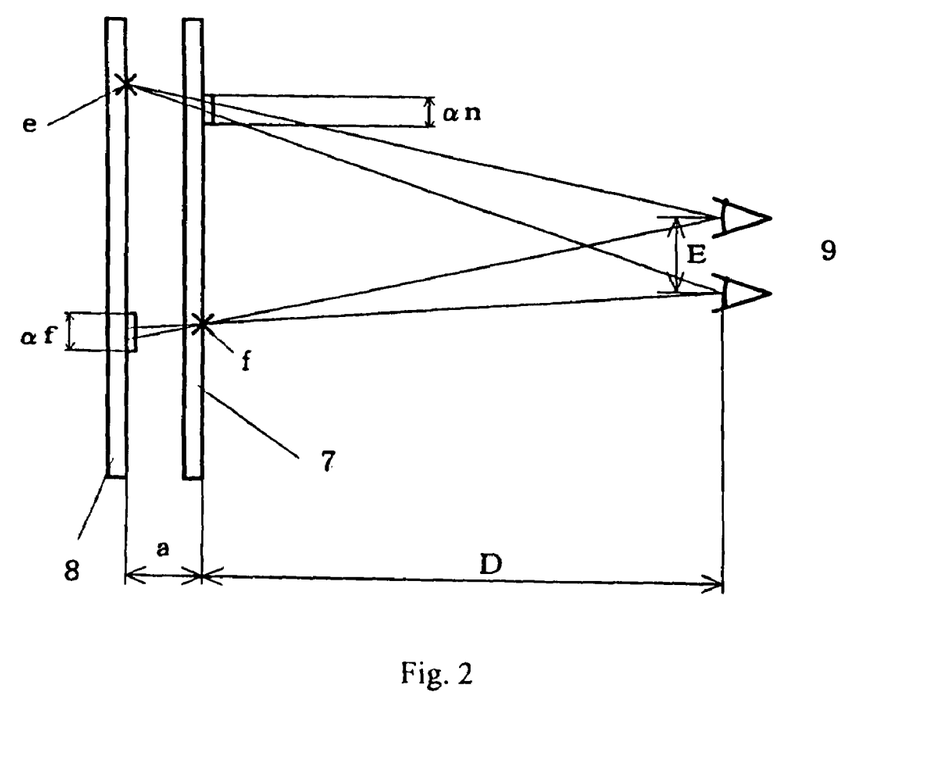
FIG. 2 shows a display unit of the three-dimensional image observation microscope system of Embodiment 1.

FIGS. 1 and 2 show the imaging unit and display unit, respectively, of the three-dimensional image observation microscope system of Embodiment 1.

Referring to FIG. 1, the imaging unit has an optical system that satisfies Conditions (1), (2), and (3) above and includes, arranged in order from the object side, an objective lens 1 that collimates the light from an object O, a zoom optical system 2 that afocally zooms a light beam from the objective lens 1, an imaging lens 3 that forms an image carried by the afocal light beam emerging from the zoom optical system 2, a beam splitter 4 that splits the light beam from the imaging lens 3, and image pickup surfaces In and If of imaging devices 5 and 6 that capture images carried by the light beams split by the beam splitter 4.

FIG. 1 shows the positional relationship between the image position I of an object O and the conjugate positions In' and If' of the image pickup surfaces In and If. Assuming that the distances between In and If and between In' and If' are d, the image pickup surfaces are preferably positioned so that the distance between the image position I and In or If is d/2. With this structure, images focused at different object point distances in the optical axis direction on either side of the object O can be captured at a desired magnification.

As shown in FIG. 2, the display unit includes a display 7 that displays an image captured by the image pickup surface In and a display 8 that displays an image captured by the image pickup surface If at a distance a from each other. A viewer 9 observes the display surface at a distance D from the nearest display.

The image display magnification is controlled so that the image size $\alpha f$ that an object point image f displayed on the display 7 has when it is displayed on the display 8 and the image size an that an object point image e displayed on the display 8 has when it is displayed on the display 7 satisfy Conditions (4) and (5) above when the viewer 9 observes the display surfaces with both eyes.

It is desirable that the difference in contrast between the images displayed on the two displays be nearly equal to the difference in MTF (modulation transfer function) between the image pickup surfaces In and If. For this purpose, the display unit has a mechanism to perform specific calculations based on image signals obtained by the image pickup devices (not shown) and an image processing mechanism such as a digital zoom (not shown). In this way, contrast images are displayed in the line of sight of the viewer 9, by which the viewer 9 can observe an enlarged three-dimensional image having a natural appearance, similar to a directly viewed image of an object.

It is also desirable that the imaging unit and display unit satisfy Condition (7) above so that images obtained by the imaging unit require less processing by the display unit.

In addition, it is desirable that the displays of the display unit be, for example, transmission type liquid crystal displays. Further, an image synthesis optical system such as a half mirror may be provided on the optical path of the display unit.

EMBODIMENT 2

Figure 3:
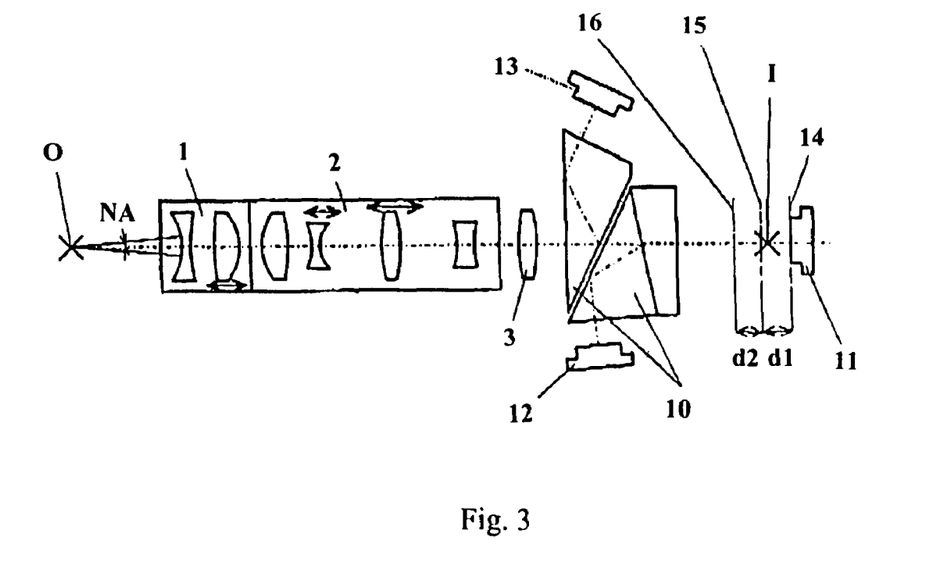
FIG. 3 shows an imaging unit of a three-dimensional image observation microscope system of Embodiment 2.
Figure 4:
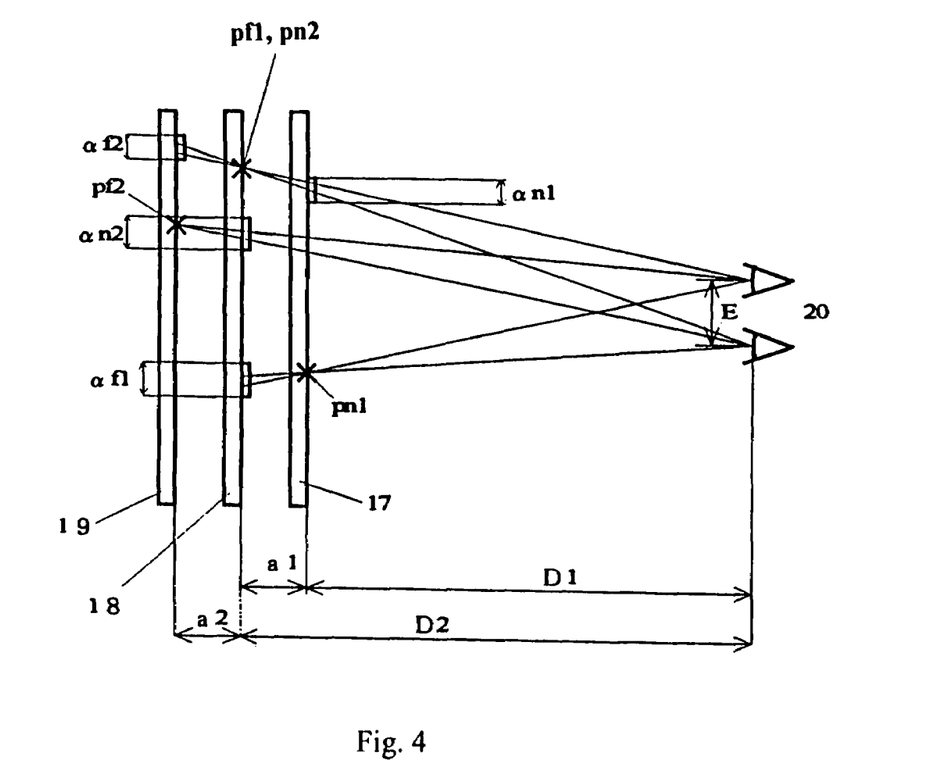
FIG. 4 shows a display unit of the three-dimensional image observation microscope system of Embodiment 2.

FIGS. 3 and 4 show the imaging unit and display unit, respectively, of the three-dimensional image observation microscope system of Embodiment 2.

The imaging unit includes an optical system satisfying Conditions (1) and (2) above and includes, arranged in order from the object side where the reference symbol O for object is located in FIG. 3, an afocal objective lens 1, an afocal zoom optical system 2 that afocally zooms an afocal light beam from the objective lens 1, an imaging lens 3 that forms an image carried by the afocal light beam emerging from the afocal zoom optical system 2, a trisecting prism 10 that splits the light beam from the imaging lens 3, and three image pickup devices 11, 12, and 13 that capture images carried by the light beams split by the trisecting prism.

FIG. 3 shows the positional relationship between the image position I of an object O and the image pickup surface 14 of the image pickup device 11, the conjugate position 15 of the image pickup surface of the image pickup device 12, and the conjugate position 16 of the image pickup surface of the image pickup device 13. The imaging device of this embodiment has three image pickup surfaces (in this case, planar surfaces) arranged on either side of the image position I of the object O, and the following Conditions (3-1) and (3-2) are satisfied:

$$0.25 \leq d1 \cdot NA/(R \cdot \beta) \leq 2 \qquad \text{Condition (3-1)}$$

$$0.25 \leq d2 \cdot NA/(R \cdot \beta) \leq 2 \qquad \text{Condition (3-2)}$$

where d1 is the distance between the image pickup surface 14 of the image pickup device 11 and the conjugate position 15 of the image pickup surface of the image pickup device 12;

d2 is the distance between the conjugate position 15 of the image pickup surface 12 and the conjugate position 16 of the image pickup surface of the image pickup device 13; and NA, R and $\beta$ are as defined for Conditions (1)-(3) above.

As shown in FIG. 4, the display unit includes a display 17 that is nearest the observer that displays an image captured by the image pickup surface 14, a display 18 (that, of three displays 17, 18 and 19 is a mid-distance from the observer) that displays an image captured by the image pickup surface of the image pickup device 12, and a display 19 that is farthest from the observer and that displays an image captured by the image pickup surface of the of the image pickup device 13.

The image display magnification is controlled so that Conditions (4-1) and (5-1) below are satisfied. Furthermore, the image display magnification is controlled so that Conditions (4-2) and (5-2) below are satisfied:

$$\alpha n1 > a1 \cdot E/(D1+a1) \qquad \text{Condition (4-1)}$$

$$\alpha f1 > a1 \cdot E/D1 \qquad \text{Condition (5-1)}$$

$$\alpha n2 > a2 \cdot E/(D2+a2) \qquad \text{Condition (4-2)}$$

$$\alpha f2 > a2 \cdot E/D2 \qquad \text{Condition (5-2)}$$

where $\alpha n1$ is the image size that an object point image pf1 that is displayed on the display 18 has when it is displayed on the display 17;

a1 is the distance between the display 17 and the display 18;

E is the interpupillary distance of the viewer (desirably, E=80 mm or larger);

D1 is the distance between a viewer 20 and the display 17;

$\alpha f1$ is the image size that an object point image pn1 that is displayed on the display 17 has when it is displayed on the display 18;

$\alpha n2$ is the size that an object point image pf2 that is displayed on the display surface 19 has when it is displayed on the display surface 18;

a2 is the distance between the displays 18 and 19;

$\alpha f2$ is the size that an object point image pn2 that is displayed on the display surface 18 has when it is displayed on the display surface 19; and D2 is the distance between the viewer 20 and the display 18.

It is desirable that the differences in contrast among images displayed on the three displays be nearly equal to the differences in MTF among the respective image pickup surfaces. For this purpose, the display unit has a mechanism to perform specific calculations based on image signals obtained by the image pickup devices (not shown) and an image processing mechanism such as a digital zoom (not shown). In this way, contrast information contained in images displayed in the line of sight of the viewer 20 is increased in density, by which the viewer 20 can observe an enlarged three-dimensional image having a more natural appearance.

The image pickup devices of the imaging unit and the displays of the display unit can be increased in number. In such cases, it is desirable that three image pickup surfaces that are near to each other on the optical axis of the optical system of the imaging unit satisfy Conditions (3-1) and (3-2) above and the display surfaces of three displays that are near to each other in the line of sight of the viewer 20, on which the images obtained by the three image pickup surfaces are displayed, satisfy Conditions (4-1) and (5-1) above, as well as Conditions (4-2) and (5-2) above.

In the imaging unit of Embodiments 1 and 2 above, the light beam is split on the image side of the imaging lens 3. However, the light beam can be split on the object side of the imaging lens 3.

EMBODIMENT 3

Figure 5:
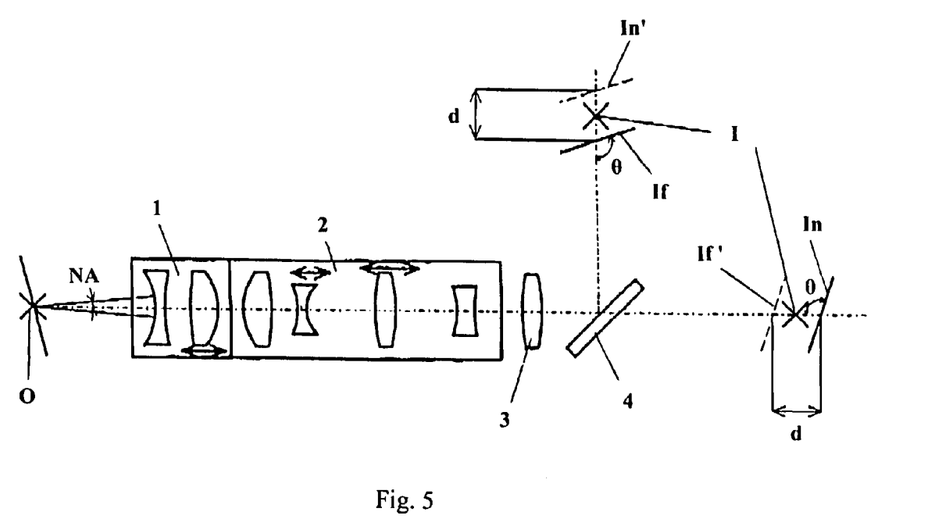
FIG. 5 shows an imaging unit of a three-dimensional image observation microscope system of Embodiment 3.
Figure 6:
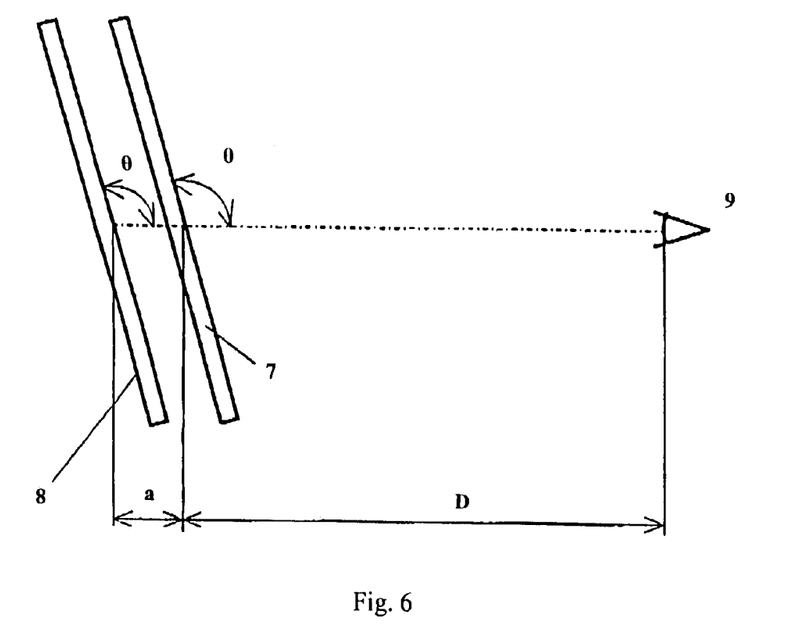
FIG. 6 shows a display unit of the three-dimensional image observation microscope system of Embodiment 3.

FIGS. 5 and 6 show the imaging unit and the display unit, respectively, of the three-dimensional image observation microscope system of Embodiment 3. This embodiment has the same basic system structure as Embodiment 1. Therefore, only an explanation of aspects of the structure that differ from Embodiment 1 will be given below.

Actual microscopic observation in Embodiment 3 involves three-dimensional object surfaces that are tilted relative to the optical axis of the optical system of the imaging unit. Therefore, the image pickup surfaces of the imaging unit of this embodiment are tilted according to the inclination of the object surface. Furthermore, the inclinations of the image pickup surfaces are controlled in association with a zoom lens mechanism or a focusing mechanism that is provided in the optical system of the imaging unit so that images are always focused on the object surface.

On the other hand, the display unit detects the inclinations of the image pickup surfaces and tilts the display surfaces of the displays the same amount as the image pickup surfaces are tilted. In this way, the inclination of an observed surface in relation to the optical axis of the optical system of the imaging device is taken into account. Thus, a viewer 9 can observe an image displayed on the display unit as a natural three-dimensional image without distortion from the center to the periphery of the field of view. As shown in FIGS. 5 and 6, the inclination of various surfaces are indicated as an angle θ.

EMBODIMENT 4

Figure 7:
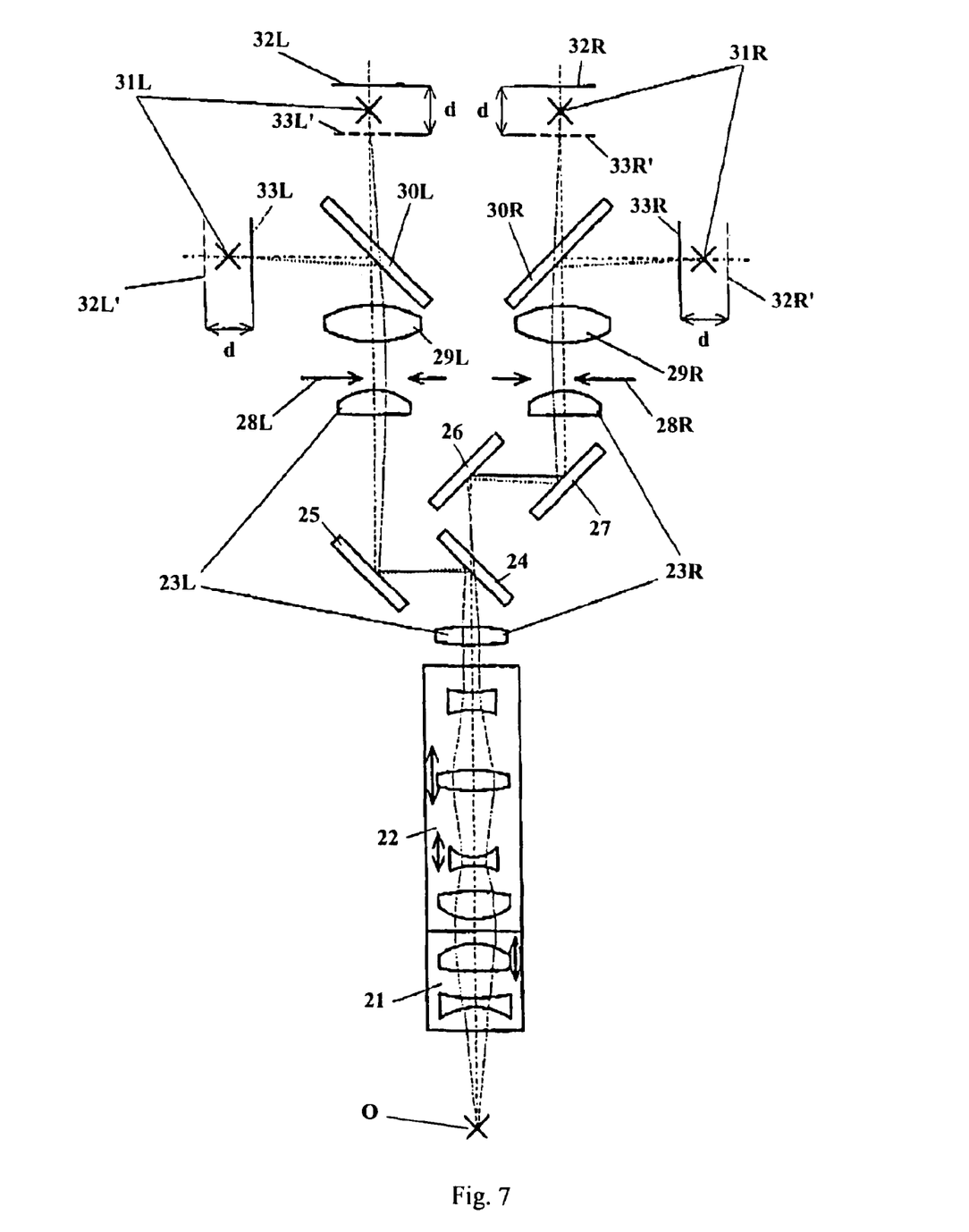
FIG. 7 shows an imaging unit of a three-dimensional image observation microscope system of Embodiment 4.
Figure 9:
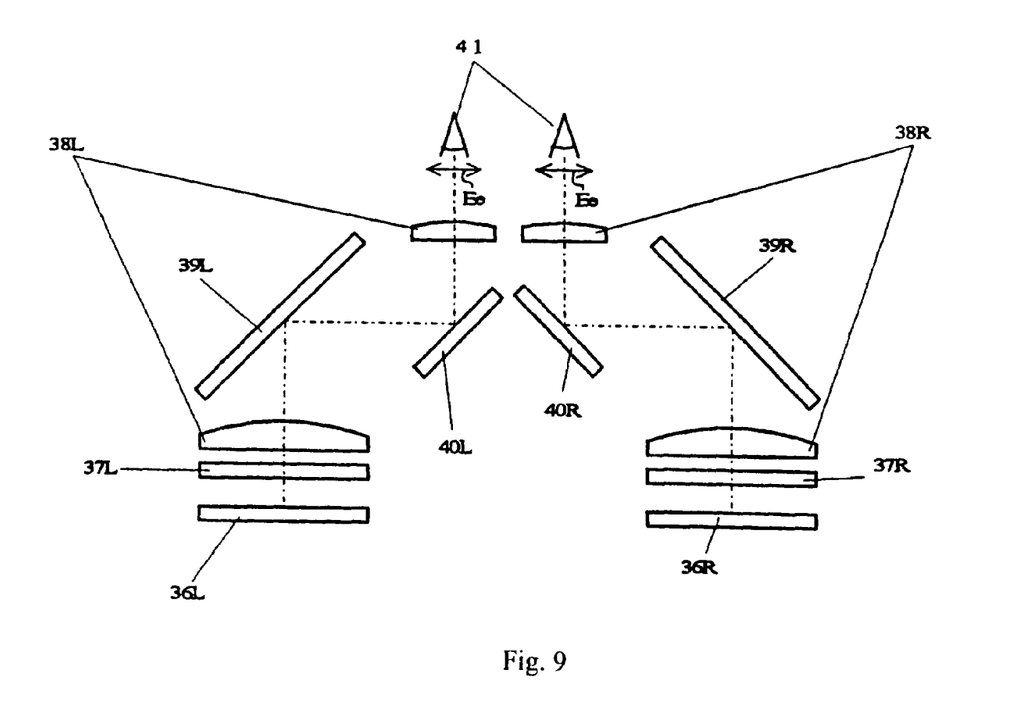
FIG. 9 shows a display unit of the three-dimensional image observation microscope system of Embodiment 4.

FIGS. 7 and 9 show the imaging unit and display unit, respectively, of the three-dimensional image observation microscope system of Embodiment 4.

As shown in FIG. 7, the imaging unit includes, in order from the object side: an objective lens 21 that obtains an image of an object and emits a collimated light beam; a zoom optical system 22 that afocally zooms the light beam from the objective lens 21; relay lenses 23L, 23R that relay the pupil of the zoom optical system; a beam splitter 24 that is provided in the relay lenses for splitting the light into an optical path for obtaining a left eye image and an optical path for obtaining a right eye image; aperture diaphragms 28L and 28R that are provided in the optical paths split by the beam splitter at eccentric positions in relation to the optical axis, for adding parallax information to images obtained by left and right image pickup devices; imaging lenses 29L and 29R that form images carried by the light beams that have passed through the aperture diaphragms on the image pickup surfaces of image pickup devices; beam splitters 30L and 30R that split the imaging light beams from the imaging lenses into two optical paths; and image pickup surfaces 32L, 33L and 32R, 33R provided on either side of the image positions 31L and 31R of an object O for capturing object images focused on different positions. The beam splitter 24 and the reflecting members 25, 26 and 27 that control the distance between the left and right optical paths are provided within the optical paths of the left and right relay lenses 23L, 23L, 23R and 23R.

FIG. 7 shows the positional relationship among the image positions 31L, 31R of the object O, the image pickup surfaces 32L, 32R and their conjugate positions 32L', 32R', and the image pickup surfaces 33L, 33R and their conjugate positions 33L', 33R'. In the imaging unit of this embodiment, the image pickup surfaces are provided on either side of the image position of the object O, and the following Condition (8) is satisfied:

$$0.25 \leq dNAlr/(R \cdot \beta) \leq 2 \qquad \text{Condition (8)}$$

where
- d is the distance, in mm, between the image pickup surfaces and the conjugate positions of the image pickup surfaces of the image pickup devices;
- NAlr is the object-side numerical aperture of the objective lens of the imaging unit when the zoom optical system has a magnification β;
- R is the width, in mm, of a pair of black and white lines when the pair of black and white lines are part of a test chart having evenly-spaced, parallel sets of black and white lines and the test chart is placed in a plane that is conjugate with an image pickup surface of one of the image pickup devices with respect to the objective lens of the imaging unit so that an image of the pair of black and white lines is captured on the image pickup surface of one of the image pickup devices in such a manner that the black and white lines are displayed on a monitor with a contrast of 10% through a circuit system that processes image signals sent from the image pickup devices; and
- β is the magnification of the zoom optical system.

Additionally, it is desirable that the imaging unit of Embodiment 4 of the present invention satisfies the following Conditions (9) and (10):

$$fob \cdot NAlrmax \geq 15 \text{ mm} \qquad \text{Condition (9)}$$

$$NAlrmin \geq 0.02 \qquad \text{Condition (10)}$$

where
- fob is the focal length, in mm, of the objective lens of the imaging unit;
- NAlrmax is the maximum object-side numerical aperture of the objective lens of the imaging unit; and
- NAlrmin is the minimum object-side numerical aperture of the objective lens of the imaging unit.

With the imaging unit having the above structure, information of parallax and contrast in the line of sight can be provided as information for the viewer in order for the viewer to perceive a three-dimensional image.

Figure 8:
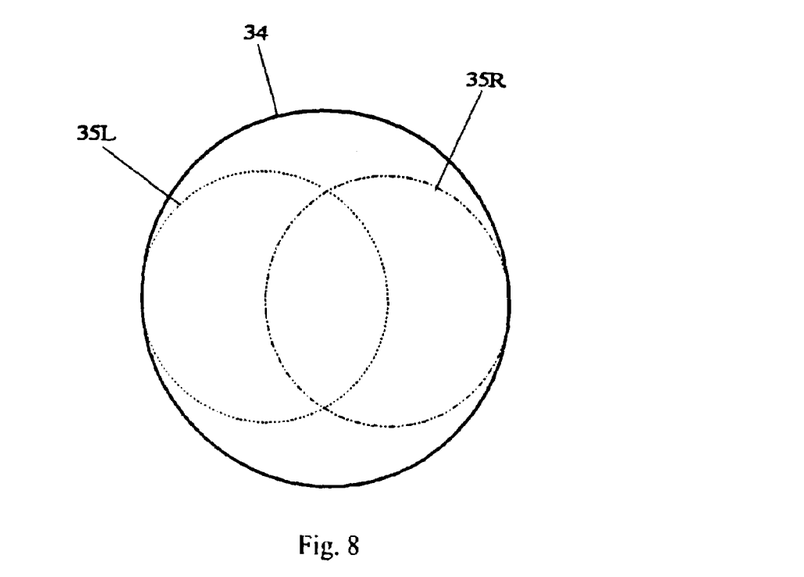
FIG. 8 shows the apertures 35L and 35R of left and right aperture diaphragms overlapped with the aperture 34 of an imaging unit.

FIG. 8 shows the apertures 35L and 35R of left and right aperture diaphragms 28L and 28R, respectively, being projected onto and overlapped with the aperture 34 of the zoom optical system, which defines the aperture of the imaging unit in order to show how large the aperture diameter of the imaging unit can be when the left and right aperture diaphragms are provided at eccentric positions in relation to the optical axis. As shown in FIG. 8, the left and right aperture diaphragms of Embodiment 4 have an aperture diameter larger than half the aperture diameter of the imaging unit with no left and right aperture diaphragms. This ensures sufficient parallax while the optical system has a large aperture.

As shown in FIG. 9, the display unit of Embodiment 4, includes, arranged in order from the farthest position from the observation position of the viewer 41, displays 36L and 36R that display images obtained by the left and right image pickup surfaces 33L and 33R, displays 37L and 37R that display images obtained by the left and right image pickup surfaces 32L and 32R, and left and right ocular lenses 38L and 38R that enlarge images displayed on the displays for observation. Reflecting members 39L, 39R and 40L, 40R that control the distance between the left and right optical paths according to the interpupillary distance of the viewer are provided in the optical path of the ocular lens. In FIG. 9, Ee, Ee designate regions for obtaining three-dimensional observation. The observer can view three-dimensional images when he puts his left and right eyes in the regions Ee, Ee, respectively.

It is also desirable that the display unit of Embodiment 4 of the present invention satisfy the following Conditions (11) and (12) so that images on the displays 37L and 37R and images on the displays 36L and 36R are overlapped regardless of which eye the viewer moves within the range Ee:

$$\alpha ne > ae \cdot Ee/(2 \cdot foc + ae) \quad \text{Condition (11)}$$

$$\alpha fe > ae \cdot Ee/2 \cdot foc \quad \text{Condition (12)}$$

where

αne is the image size that an object point image fe displayed on the display surface of the display 36L has when it is displayed on the display surface of the display 37L;

ae is the distance between the display surfaces of the displays 36L and 37L;

Ee is the range of adjustment of the interpupillary distance of the ocular lens of the display unit for three-dimensional viewing;

foc is the focal length of the ocular lens; and

αfe is the image size that an object point image fg displayed on the display surface of the display 37L has when it is displayed on the display surface of the display 36L.

Figure 10:
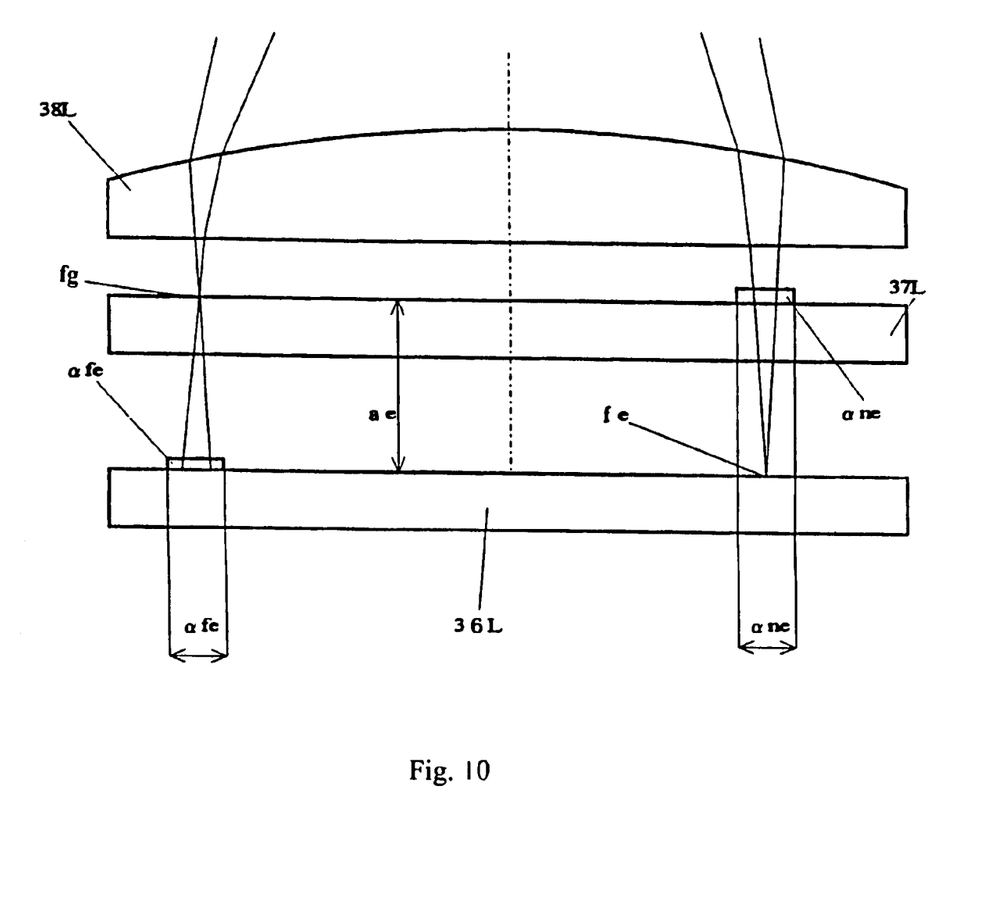
FIG. 10 shows the relationships among parameters of the left eye display unit 1.

FIG. 10 shows the relationships of parameters of the left eye display unit. The right eye display unit has the same relationships, and therefore, a separate explanation of its arrangement will not be provided.

As described above, contrast information is added to images displayed in the line of sight of the viewer 41 and parallax information is further added to divided right and left eye images, thereby ensuring reproduction of a three-dimensional appearance that is in no way inferior to direct visual observation of an object providing three-dimensional images. The three-dimensional image observation microscope system of Embodiment 4 of the present invention provides enlarged images for three-dimensional image observation that allows the observer to perceive a natural appearance and does not cause eye fatigue after prolonged observation.

Most people have an interpupillary distance of 55 to 75 mm and a maximum pupil diameter of approximately 7 mm. With the right and left ranges of Ee being apart from each other 65 mm and having a diameter of 13.5 mm, most people can receive the benefit of three-dimensional observation without adjusting the interpupillary distance. With the range Ee having a larger diameter, motion parallax effect is added and an enhanced three-dimensional appearance can be obtained. For example, an excellent three-dimensional appearance is preferably obtained when Ee has a diameter of approximately 20 mm.

It is desirable that the displays of the display unit be, for example, transmission-type liquid crystal displays. An image synthesis optical system such as a half mirror can be provided in the optical path of the display unit.

EMBODIMENT 5

Figure 11:
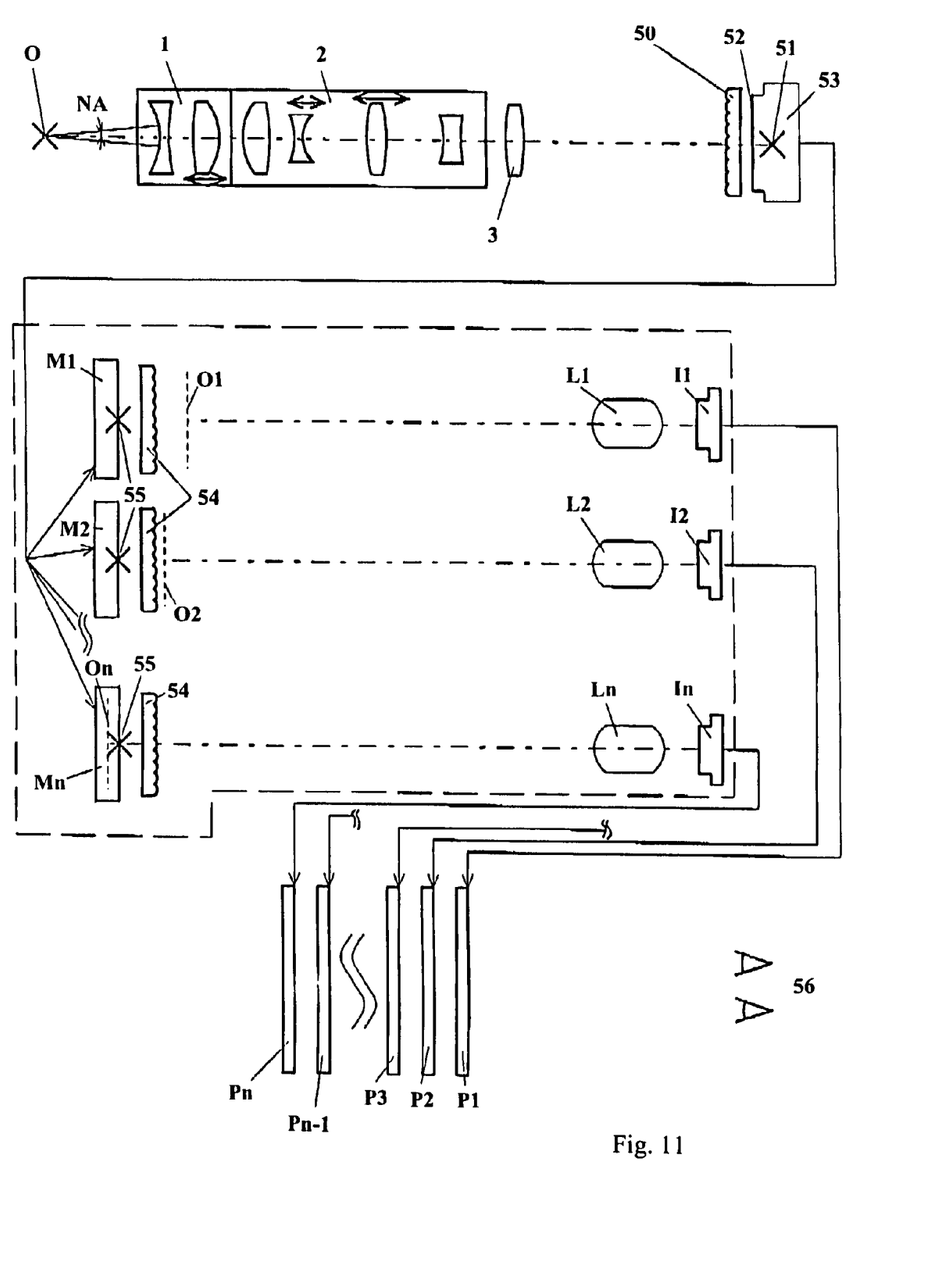
FIG. 11 shows the configuration of the three-dimensional image observation microscope system of Embodiment 5.

FIG. 11 shows the configuration of the three-dimensional image observation microscope system of Embodiment 5. The three-dimensional image observation microscope system of this embodiment is formed of an imaging apparatus (shown in the top portion of FIG. 11) and a display apparatus. The display apparatus is formed of an image processor (shown in the middle portion of FIG. 11) and an image display (shown in the bottom portion of FIG. 11). The imaging apparatus has the same structure as that of Embodiment 2 from the objective lens 1 to the imaging lens 3, and thus further description thereof will be omitted. A micro-lens array 50 is provided between the imaging lens 3 and an image pickup surface 52 of an image pickup device 53. The image pickup surface 52 of the image pickup device 53 is provided on the object side of a point 51 where an image of an object O is formed by the optical system (which includes the objective lens 1 to the micro-lens array 50).

An image that is captured by the image pickup device 53 is displayed on one or more displays M(i), where i may equal 1 to n and n is a natural number of 2 or higher, that is provided in the image processor. The displays M(i) are each provided with a micro-lens array 54. The display surface of each of the displays M(i) is positioned at the focal point 55 of a micro-lens array 54.

Figure 12:
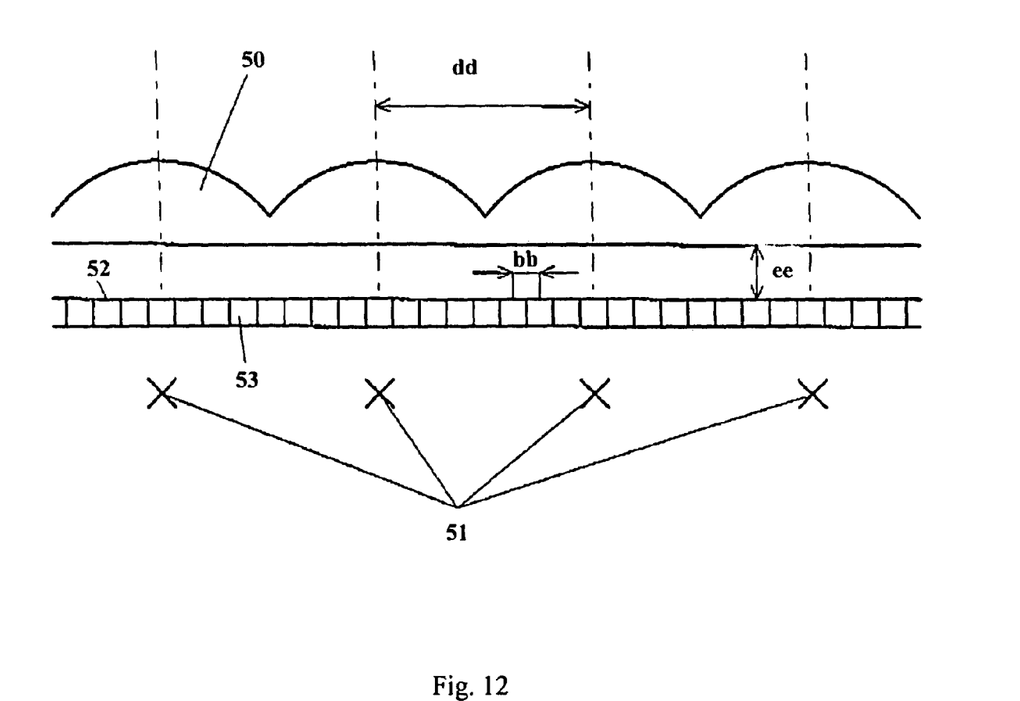
FIG. 12 is an enlarged view of the image pickup surface 52 of the image pickup device 53, and its surrounding area, of Embodiment 5.
Figure 13:
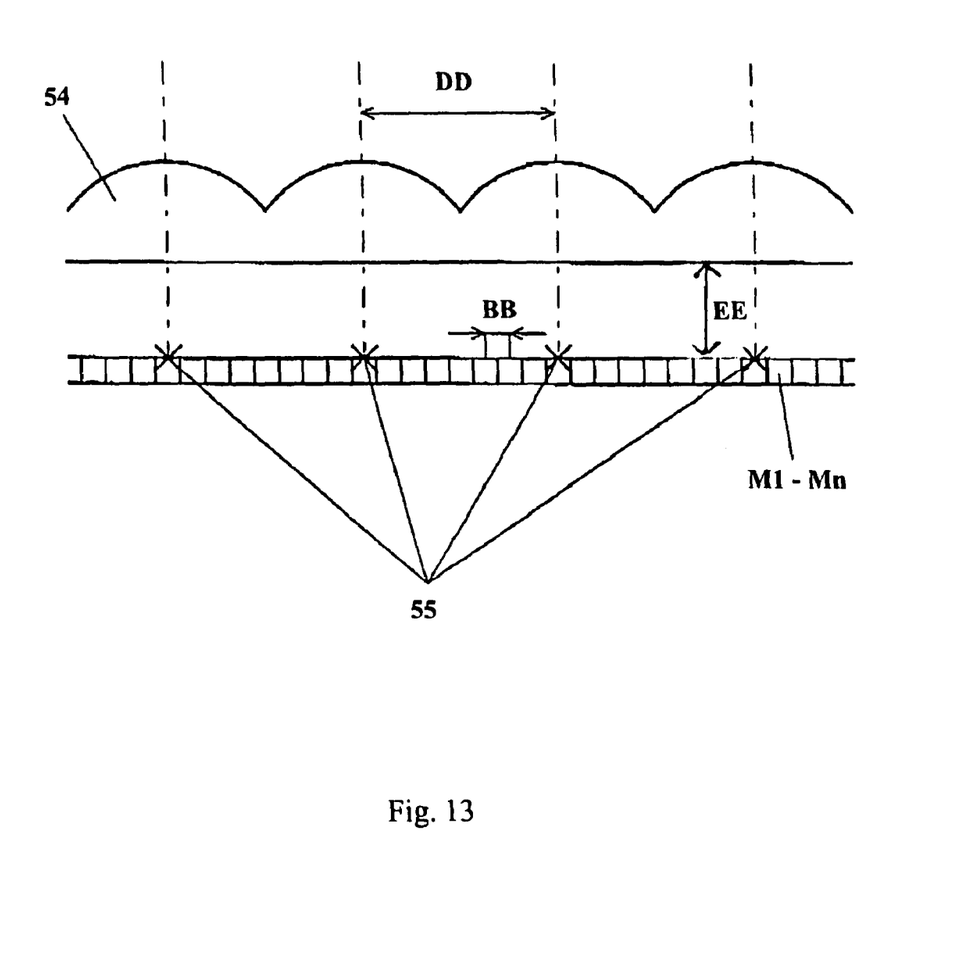
FIG. 13 is an enlarged view of the display surface of a display Mn, and its surrounding area, of Embodiment 5.

FIG. 12 is an enlarged view of the image pickup surface 52 of the image pickup device 53 and its surrounding area in the imaging apparatus. FIG. 13 is an enlarged view of the display surface of the display M(i) and its surrounding area in the image processor. In this embodiment, the following Condition (13) is satisfied:

$$bb/BB = dd/DD = ee/EE \quad \text{Condition (13)}$$

where bb is the distance between pixels of the image pickup device 53;

BB is the distance between picture elements of the display M(i), where i may equal 1 to n and n is a natural number of 2 or higher;

dd is the distance between adjacent micro-lenses of a micro-lens array 50 that is provided between the imaging lens and an image pickup surface 52 of the image pickup device 53;

DD is the distance between adjacent micro-lenses of a micro-lens array 54 that is associated with the display M(i), where i equals 1 to n and n is a natural number of 2 or higher;

ee is the distance between the micro-lens array 50 and the image pickup surface 52 of the image pickup device 53; and EE is the distance between the display surface of the display M(i) and the micro-lens array 54 (see FIG. 13), where i equals 1 to n and n is a natural number of 2 or higher.

In this way, an image captured through the micro-lens array 50 is displayed on the display surface of the display M(i) and observed through the micro-lens arrays 54, the image being observed as a three-dimensional image. An image captured by the image pickup device 53 is shared by the display surfaces of the displays M(i). Therefore, overlaid images observed through the micro-lens arrays 54 are all the same size.

The image processor (middle portion of FIG. 11) comprises imaging lenses L1 to Ln and image pickup devices I1 to In for capturing three-dimensional images through the micro-lens arrays 54. The image pickup devices I1 to In capture images focused on different points O1 to On through the imaging lenses L1 to Ln.

Images captured by the image pickup devices I1 to In are displayed on displays P1 to Pn provided in the image display (bottom portion of FIG. 11). The displays P1 to Pn are provided at intervals within the line of sight of a viewer 56. The displays Pi−1 and Pi+1 placed immediately before and after a display Pi (where i is any natural number of 2 or higher) satisfy the above Conditions (4-1), (4-2), (5-1), and (5-2).

An image focused on the point 01 closest to the image pickup device in the image processor is displayed on the display P1 closest to the viewer 56 in the image display. An image focused on a point O2 that is closer to the display surface of the display than the focused point O1 in the image processor is displayed on the display P2 that is farther away from the viewer 56 than the display P1 in the image display.

With this structure, the viewer 56 can observe an object image captured by the imaging apparatus through the display apparatus as a three-dimensional image. With just one image pickup device, the imaging apparatus of this embodiment can be reduced in size and weight. With the image processor provided in the display apparatus, the three-dimensional image observed by the viewer 56 through the image display can be easily adjusted for better three-dimensional appearance. The image processor of the display apparatus can be placed somewhere not disturbing the viewer 56 at work. Only the imaging apparatus and the image display of the display apparatus are placed close to the viewer 56, thereby creating an environment in which the viewer 56 can easily conduct his work.

Additionally, the image processor can be replaced with arithmetic circuits for image analysis. In such a case, the arithmetic circuits create multiple images focused on different points based on images captured by the imaging apparatus and display them on the image display, by which a similar three-dimensional image can be observed.

Figure 14:
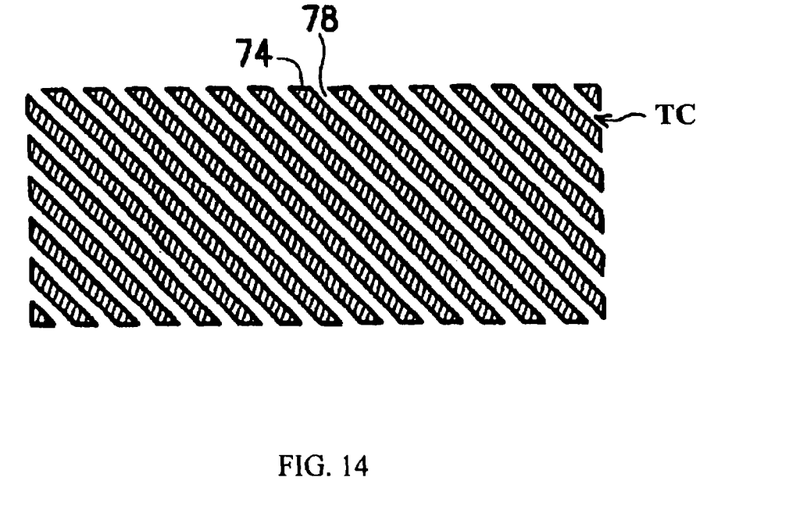
FIG. 14 shows a pair of black and white lines that form part of a test chart.
Figure 15:
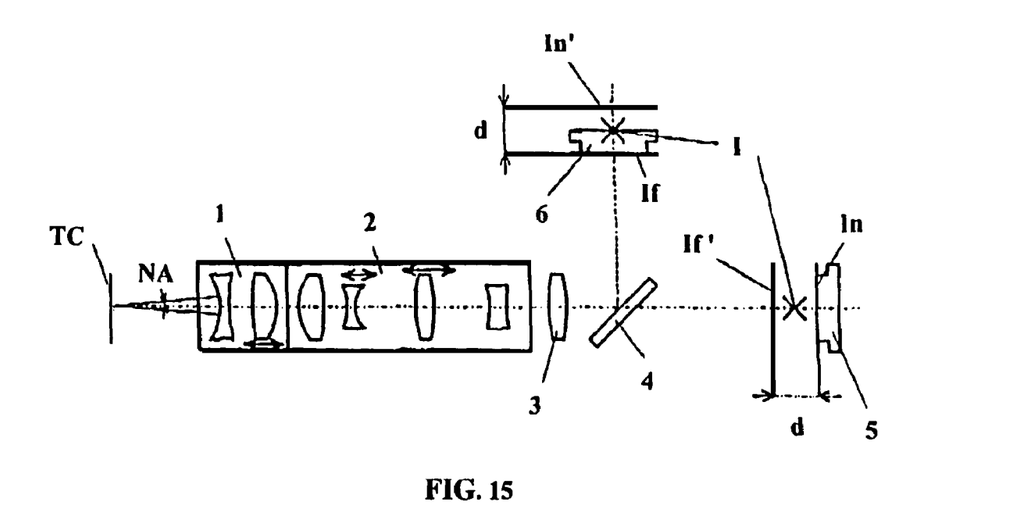
FIG. 15 shows a test chart that includes a pair of black and white lines as shown in FIG. 14 positioned at a location in front of the objective optical system that is conjugate with an image pickup surface of an image pickup device.

FIG. 14 shows a pair 74, 78 of black and white lines that form part of a test chart, and FIG. 15 shows a test chart TC that includes the pair of black and white lines shown in FIG. 14 positioned at a location in front of the objective lens 1 of Embodiment 1 at a position that is conjugate with an image pickup surface of one of the image pickup devices.

The present invention is not limited to the aforementioned embodiments, as it will be immediately apparent that various alternative implementations are possible. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A three-dimensional image observation microscope system comprising:

an imaging unit that captures images focused at different object point distances in an optical axis direction; and a display unit that displays a plurality of images that are captured by the imaging unit for overlaid observation along the line of sight of a viewer; wherein the imaging unit includes an objective optical system that obtains an image of an object, a zoom optical system that controls the magnification of the image obtained by the objective optical system, and a plurality of image pickup devices that capture images having a magnification that is controlled by the zoom optical system; and the following conditions are satisfied:

$$fob \cdot NAmax \geq 15 \text{ mm}$$

$$NAmin \geq 0.02$$

$$0.25 \leq d \cdot NA/(R \cdot \beta) \leq 2$$

where fob is the focal length, in mm, of the objective optical system;

NAmax is the maximum object-side numerical aperture of the objective optical system of the imaging unit;

NAmin is the minimum object-side numerical aperture of the objective optical system of the imaging unit;

d is the distance, in mm, between two adjacent image pickup surfaces of the image pickup devices;

NA is the object-side numerical aperture of the objective optical system of the imaging unit when the zoom optical system has a magnification β;

R is the width, in mm, of a pair of black and white lines when the pair of black and white lines are part of a test chart having evenly-spaced, parallel sets of black and white lines and the test chart is placed in a plane that is conjugate with an image pickup surface of one of the image pickup devices with respect to the objective optical system of the imaging unit so that an image of the pair of black and white lines is captured on the image pickup surface of one of the image pickup devices in such a manner that the black and white lines are displayed on a monitor with a contrast of 10% through a circuit system that processes image signals sent from the image pickup devices; and β is the magnification of the zoom optical system.

2. The three-dimensional image observation microscope system of claim 1, wherein:

the display unit includes a plurality of display surfaces in the line of sight of the viewer;

an image focused on an object closer to the imaging unit is displayed at a position closer to the viewer, and an image focused on an object farther away from the imaging unit is displayed at a position farther away from the viewer;
said plurality of display surfaces are two display surfaces that are adjacent to one another in the line of sight of the viewer; and
the following conditions are satisfied:

$$\alpha n > a \cdot E/(D+a)$$

$$\alpha f > a \cdot E/D$$

where
- $\alpha n$ is the size that an object point image that is displayed on one of said two display surfaces, namely, the display surface that is farther away from the viewer, has when it is displayed on the other of said two display surfaces that is closer to the viewer;
- a is the distance between said two display surfaces;
- E is the interpupillary distance of the viewer;
- D is the distance between the viewer's observation position and the display surface that is closer to the viewer; and
- $\alpha f$ is the size that an object point image displayed on the display surface that is closer to the viewer has when it is displayed on the display surface that is farther from the viewer.

3. The thee-dimensional image observation microscope system of claim 2, wherein:
the imaging unit and the display unit satisfy the following conditions:

$$NAmax \geq 0.15$$

$$|\beta id \cdot (Ii \cdot \tan \gamma)/D| \leq 1\ 0.2$$

where
- $\beta id$ is the magnification at which an image formed on the image pickup surface of the image pickup device is displayed on the display surface that is closer to the viewer,
- Ii is the distance, in mm, between an optical axis and a point at the maximum image height on the image pickup surface of an image pickup device provided in the imaging unit; and
- $\gamma$ is the inclination, in relation to the optical axis, of the principal ray entering the image pickup surface of the image pickup device provided in the imaging unit at said point of maximum image height.

4. A thee-dimensional image observation microscope system comprising:
an imaging unit that captures images focused at different object point distances in an optical axis direction; and
a display unit that displays a plurality of images captured by the imaging unit for overlaid observation along the optical axis of an ocular lens; wherein
the imaging unit includes, in order from an object side, an objective lens that obtains an object image and emits a collimated light beam, a zoom optical system that afocally zooms the light beam from the objective lens, a relay lens that relays a pupil in the zoom optical system, a beam splitter provided in the relay lens to split light into an optical path for obtaining a left eye image and an optical path for obtaining a right eye image, aperture diaphragms in the optical paths split by the beam splitter at eccentric positions in relation to the optical axis of the relay lens for adding parallax information to images, imaging lenses that form images carried by the light beams that have passed through the aperture diaphragms, and image pickup devices located before and after the object image position so as to capture object images focused on different positions; and
the following condition is satisfied:

$$0.25 \leq d \cdot NAIr/(R \cdot \beta) \leq 2$$

where
- d is the distance, in mm, between two adjacent image pickup surfaces of the image pickup devices;
- NAlr is the object-side numerical aperture of the objective lens of the imaging unit when the zoom optical system has a magnification $\beta$;
- R is the width, in mm, of a pair of black and white lines when the pair of black and white lines are part of a test chart having evenly-spaced, parallel sets of black and white lines and the test chart is placed in a plane that is conjugate with an image pickup surface of one of the image pickup devices with respect to the objective lens of the imaging unit so that an image of the pair of black and white lines is captured on the image pickup surface of one of the image pickup devices in such a maimer that the black and white lines are displayed on a monitor with a contrast of 10% through a circuit system that processes image signals sent from the image pickup devices; and
- $\beta$ is the magnification of said zoom optical system.

5. The three-dimensional image observation microscope system of claim 4, wherein:
the display unit includes a plurality of displays displaying both left and right images obtained by the image pickup devices of the imaging unit, and a pair of ocular lenses for enlarging for observation the images displayed on the plurality of displays;
the plurality of displays are provided on the optical axis of each of the ocular lenses so that an image of an object point that is closer to the imaging unit is displayed at a position closer to the ocular lens and an image of an object point that is farther away from the imaging unit is displayed at a position farther away from the ocular lens; and
the display surfaces of adjacent displays on the optical axes of the ocular lenses satisfy the following conditions:

$$\alpha ne > ae \cdot Ee/(2 \cdot foc + ae)$$

$$\alpha fe > ae \cdot Ee/(2 \cdot foc)$$

where
- $\alpha ne$ is the size that an object point image displayed on a display surface of a display that is farther away from an ocular lens has when it is displayed on a display surface of a display that is closer to the ocular lens;
- ae is the distance between the display surfaces of the displays;
- Ee is the range of adjustment of the interpupillary distance of the ocular lenses of the display unit;
- foc is the focal length of an ocular lens; and
- $\alpha fe$ is the size that an object point image displayed on the display surface of the display that is closer to an ocular lens has when it is displayed on the display surface of the display that is farther away from the ocular lens.

6. The three-dimensional image observation microscope system of claim 4, wherein the imaging unit further satisfies the following conditions:

$f_{ob} \cdot NA_{Irmax} \geq 15$ mm $NA_{Irmin} \geq 0.02$ where
    $f_{ob}$ is the focal length, in mm, of the objective lens of the imaging unit;
    $NA_{Irmax}$ is the maximum object-side numerical aperture of the objective lens of the imaging unit; and
    $NA_{Irmin}$ is the minimum object-side numerical aperture of the objective lens of the imaging unit.

* * * * *